United States Patent
Thornton et al.

(10) Patent No.: US 6,604,565 B2
(45) Date of Patent: Aug. 12, 2003

(54) CONTINUOUS PROCESS FOR MANUFACTURING IMAGEABLE SEAMED BELTS FOR PRINTERS

(75) Inventors: Constance J. Thornton, Ontario, NY (US); Joseph A. Swift, Ontario, NY (US); Edward L. Schlueter, Jr., Rochester, NY (US); Theodore Lovallo, Williamson, NY (US)

(73) Assignee: Xerox Corporation, Stamford, CT (US)

( * ) Notice: Subject to any disclaimer, the term of this patent is extended or adjusted under 35 U.S.C. 154(b) by 58 days.

(21) Appl. No.: 10/041,978

(22) Filed: Jan. 9, 2002

(65) Prior Publication Data

US 2002/0066520 A1 Jun. 6, 2002

Related U.S. Application Data

(62) Division of application No. 09/470,931, filed on Dec. 22, 1999, now Pat. No. 6,358,347.

(51) Int. Cl.⁷ .................................................. F16G 1/00
(52) U.S. Cl. ........................ 156/459; 156/461; 156/466; 156/517; 156/578
(58) Field of Search ................................ 156/259–260, 156/203, 304.5, 218, 211, 137, 271, 443, 459, 461, 466, 510, 512, 517, 578; 83/13, 343, 674, 425.2, 914; 219/121.67, 121.68, 121.69

(56) References Cited

U.S. PATENT DOCUMENTS

| | | | | |
|---|---|---|---|---|
| 4,604,310 A | * | 8/1986 | Bertotto | 428/35.6 |
| 4,680,071 A | * | 7/1987 | Candle | 156/218 |
| 5,002,626 A | * | 3/1991 | Tezuka et al. | 156/252 |
| 5,487,707 A | * | 1/1996 | Sharf et al. | 474/253 |
| 5,997,974 A | * | 12/1999 | Schlueter et al. | 428/58 |
| 6,191,382 B1 | * | 2/2001 | Damikolas | 219/121.62 |

* cited by examiner

Primary Examiner—Sam Chuan Yao

(57) ABSTRACT

A system for manufacturing large quantities of seamed belts for printing systems with controlled imageable seams, which belts require a defined circumference and width, from suitable belt material in a large roll thereof, by feeding a continuous web of that belt material from the roll in (or cut to) a width that is at least as wide as the defined circumference of the finished seamed belt into a seam cutting station, where the opposing side edges of the continuous web of belt material are cut as they move through the seam cutting station into opposing seam-forming mating edge patterns, preferably mating puzzle-cut patterns cut by small movement laser beams on each side of the moving web. The moving web is then wrapped over a mandrel surface so that the opposing side edges of the web are brought together while said continuous web of belt material is moving, mating the opposing edge patterns together to form a belt seam in a moving tube of the web material, the belt seam is adhesively sealed, and then increments of this moving tube are intermittently transversely cut off to the selected width of the finished seamed belt.

2 Claims, 4 Drawing Sheets

CONTINUOUS PROCESS FOR MANUFACTURING IMAGEABLE SEAMED BELTS FOR PRINTERS

This application is a Divisional of application Ser. No. 09/470,931, filed Dec. 22, 1999, now U.S. Pat. No. 6,358,347 B1 and claims priority therefrom.

Disclosed in the embodiments herein is an improved, simple, low cost, process and system for continuous manufacturing imageable seamed belts from sequential portions of a roll fed web transverse a web of suitable width and material, as opposed to an interrupted and/or separate manual operation of forming such belts from lengths of such material in the elongate dimension and direction of movement of such a web.

Heretofore, most of the endless belts for intermediate image transfer belts or photoreceptor belts for xerographic printers have been expensively made as endless belts (without any seam) by individual electroforming or the like, to allow continuous and non-synchronized image formation and/or transport around the entire belt circumference; or, have been seamed belts with seams which cannot be imaged over, thus requiring synchronized seam-skipping skipped-pitch systems, which reduce the effective printing rate. Thus, a long-term goal in this art, as described in some of the references cited below, is to be able to provide a belt which will have the lower manufacturing cost of a seamed belt, yet have a belt seam which can be imaged over substantially as if there were no seam, thus allowing the seamed belt to handle continuously closely spaced non-synchronized images extending around the entire belt circumference like a seamless belt.

A small batch processing method or system of making a seamed belt having a so-called "puzzle cut" seam is to make each belt individually starting with an blank planar sheet of suitable belt material of a suitable length for the desired belt circumference, and to puzzle-cut the opposite ends thereof, one at a time, with an expensive puzzle-cutting die extending across the width of the belt. (Thus, requiring the belt blank to be aligned twice with this elongated die.) This small batch processing method is not suitable for large scale low cost manufacturing.

In contrast, in the disclosed embodiment herein, for production of multiple such belts in a continuous and more automatic manner at lower cost, a continuous web of material having a width slightly wider that the desired length or circumference of the finished belt may be roll fed and continuously simultaneous puzzle-cut on both opposing edges by much smaller, and stationary, laser (or rotary mechanical) puzzle-cutting stations in correspondence or coordination, and those opposing edges of the belt automatically brought together with their puzzle-cuts mating (interdigitated) together and cemented and coated or otherwise treated, and the resulting belts cut (before or after) to their desired width with intermittent operation of a simple linear transverse or circumferential laser or mechanical cutting or chopping system, which may also be a laser cutter.

To express this in other words, in the disclosed embodiment a large number of seamed belts may be continuously automatically produced from a continuously fed web of suitable supply material that is at least as wide as the finished belt loop must be long, so that the puzzle-cutting may be done continuously along the edges of the supply web as the supply web advances, rather than in intermittent full width transverse puzzle-cuts. This embodiment also allows the use of small fixed station high power laser puzzle-cutting systems needing only small movements of cutting laser beams in the edge areas of the continuously moving belt blank to form the puzzle-cut pattern on each side of a steadily moving web of belt material.

By way of background on imageable seamed belts, for intermediate image transfer belts or photoreceptor (PR) belts, for xerographic printers, and especially such seamed belts having so-called "puzzle cut" seams, and suitable materials therefor, there is noted, for example: Xerox Corp U.S. Pat. No. 5,487,707, by Lucille M. Sharf, et al., filed Aug. 29, 1994 and issued Jan. 30, 1996 entitled "Puzzle Cut Seamed Belt With Bonding Between Adjacent Surface By UV Cured Adhesive"; Xerox Corp U.S. Pat. No. 5,514,436 by Edward L. Schlueter, Jr., issued May 7, 1996, entitled "Puzzle Cut Seamed Belt"; Xerox Corp. U.S. Pat. No. 5,549,193, issued Aug. 27, 1996, entitled "Endless Seamed Belt with Low Thickness Differential Between the Seam and the Rest of the Belt"; Xerox Corp U.S. Pat. No. 5,997,974, issued Dec. 7, 1999, by Ed Schlueter, et al., the EPO foreign equivalent application of which was published on Mar. 31, 1999 as EPO Publication No. 905570; Xerox Corp pending U.S. application Ser. No. 08/721,418 filed Sep. 26, 1996 as and Xerox Corp pending U.S. application Ser. No. 09/004,636 filed Jan. 8, 1998 by Robert C. U. Yu, as for which the EPO equivalent was published Jul. 14, 1999 as EPO Publication No. 928907. Other, additional, Xerox Corp. patent applications on suitable such belt materials and properties are being filed contemporaneously herewith.

Although the present system is particularly suited for manufacturing such imageable seam belts for printers, especially, intermediate image transfer belts for electrophotographic printing systems, it is not limited thereto.

Further by way of background as to intermediate image transfer belts for electrophotographic printing systems, in operation, an intermediate transfer belt is typically brought into contact with a toner image-bearing member such as a photoreceptor belt with a previously exposed and developed latent image. In the contact zone an electrostatic field generating device such as a corotron, a bias transfer roller, a bias blade, or the like, creates electrostatic fields that transfer each toner image onto the intermediate transfer belt, which moves to carry that toner image on the intermediate transfer belt over into contact with a receiver, such as a copy sheet or other image substrate. A similar electrostatic field generating device may then transfers the toner image from the intermediate transfer belt to the receiver. Depending on the system, a receiver can be another intermediate transfer member or the image substrate onto which the toner will eventually be fixed. In either case the control of the electrostatic fields in and near the transfer zone is a significant factor in toner transfer.

As shown in the above-cited and other art, intermediate transfer belts may take the form of seamed belts fabricated by fastening two ends of a web material together, such as by welding, sewing, wiring, stapling, or gluing. While seamless intermediate transfer belts are also possible, they require manufacturing processes that make them much more expensive than similar seamed intermediate transfer belts. This is particularly true when the intermediate transfer belt is relatively long. While seamed intermediate transfer belts are relatively lower in cost, the seam introduces a discontinuity that interferes with the electrical, thermal, and mechanical properties of the belt. While it is possible to synchronize a printer's operation with the motion of the intermediate transfer belt such that toner is not electrostatically transferred onto the seam, such synchronization adds to the printer's expense and complexity, and results in loss of productivity. Additionally, since some high speed electrophotographic printers produce images on paper sheets that are then cut from a continuous paper "web," if a belt seam must be avoided, the resulting unused portion of the paper web may have to be cut out, producing paper waste. Furthermore, even with synchronization, mechanical problems related to the discontinuity, such as excessive cleaner wear and/or mechanical vibrations, may still exist.

Acceptable intermediate transfer belts require sufficient seam strength to achieve a desired operating life. While the desired operating life depends on the specific application, typically it will be at least 100,000 operating cycles, and preferably 1,000,000 cycles. Considering that a seamed intermediate transfer belt suffers mechanical stresses from belt tension, traveling over rollers, moving through transfer nips, and passing through cleaning systems, achieving such a long operating life is not trivial. Seam failures can cause part of the belt to lift up at the seam and damage other printer components. Thus the conflicting constraints of long life and limited topographical size at the seam places a premium on adhesive strength and good seam construction.

A "puzzle cut" approach to seamed intermediate transfer belts, such as taught in the above-cited and other prior art references, significantly reduces mechanical problems by producing an improved mechanical seam. Those references also discuss other difficulties in manufacturing a suitable belt for transferring toner images without visible defects onto and off of a seam of a seamed intermediate transfer belt, especially, suitable electrical properties.

A specific feature of the specific embodiment(s) disclosed herein is to provide an improved method of manufacturing large quantities of seamed belts with imageable seams for printing systems, wherein said seamed belts have a predetermined defined circumference and a predetermined width, from a predetermined belt material available in a large roll thereof, comprising: feeding a continuous web of said belt material from said large roll in a defined web width that is at least as wide as said predetermined defined circumference of said seamed belts, feeding said continuous web of said defined width belt material to a seam cutting station, cutting in said seam cutting station the opposing side edges of said continuous web of belt material into opposing seam-forming mating edge patterns, wrapping said opposing side edges of said continuous web of belt material together on a mandrel surface while said continuous web of belt material is moving, mating said opposing mating edge patterns together to form a belt seam in a moving tube of said continuous web of belt material, adhesively sealing said belt seam, and sequentially intermittently transversely cutting off increments of said moving tube of said continuous web of belt material to said predetermined width of said seamed belt to form said seamed belts with said predetermined defined circumference and said predetermined width.

Further specific features disclosed herein, individually or in combination, include those wherein said continuous web is moved through said seam cutting station continuously or in incremental steps; and/or wherein said seam cutting station comprises laser cutting systems on said opposing side edges of said continuous web of belt material; and/or wherein said seam cutting station comprises laser cutting systems on said opposing side edges of said continuous web of belt material operating to cut mating puzzle-cut locking seam patterns on said opposing side edges of said continuous web of belt material.

Another disclosed feature is an improved system for manufacturing large quantities of seamed belts with imageable seams for printing systems, wherein said manufactured seamed belts have a predetermined defined circumference and a predetermined width, from a belt material which is available in a large continuous web roll with opposing side edges, comprising: a seam cutting station, a web feeding system for feeding a continuous web of said belt material from said large roll to said seam cutting station in a defined web width between said opposing side edges that is at least as wide as said predetermined defined circumference of said seamed belts, said seam cutting station cutting said opposing side edges of said continuous web of belt material into opposing seam-forming mating edge patterns, a web wrapping system including a mandrel surface for wrapping said opposing side edges of said continuous web of belt material together on said mandrel surface while said continuous web of belt material is moving thereon, a seam mating system for mating said opposing mating edge patterns together to form a belt seam in a moving tube of said continuous web of belt material, an adhesive applicator system for adhesively sealing said moving belt seam, and a web tube cutting system for sequentially intermittently transversely cutting off increments of said moving tube of said continuous web of belt material to said predetermined width of said seamed belt; and/or wherein said seam cutting station comprises laser cutting systems on said opposing side edges of said continuous web of belt material operating to cut mating puzzle-cut locking seam patterns on said opposing side edges of said continuous web of belt material.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the examples below, and the claims. Thus, the present invention will be better understood from this description of specific embodiments, including the drawing figures (approximately to scale) wherein:

Figure 2:
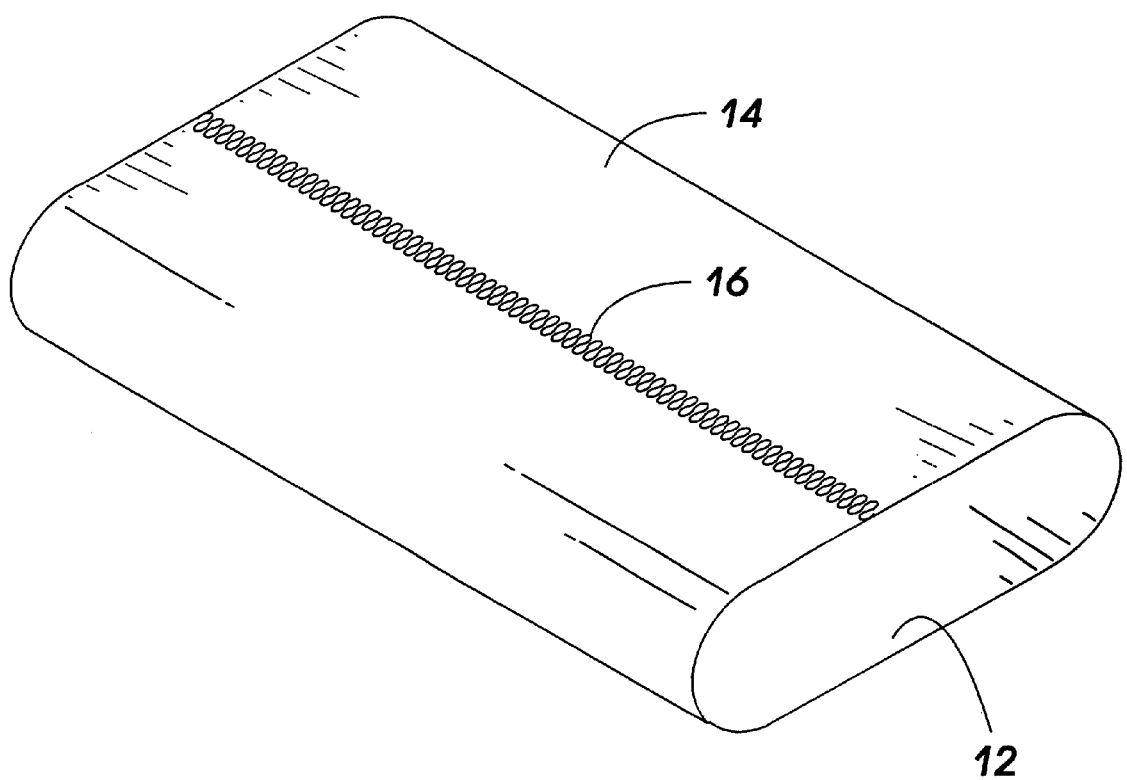
FIG. 2 is a perspective view of one exemplary seamed intermediate image transfer belt such as may be produced in the continuous manufacturing system of FIG. 1.
Figure 3:
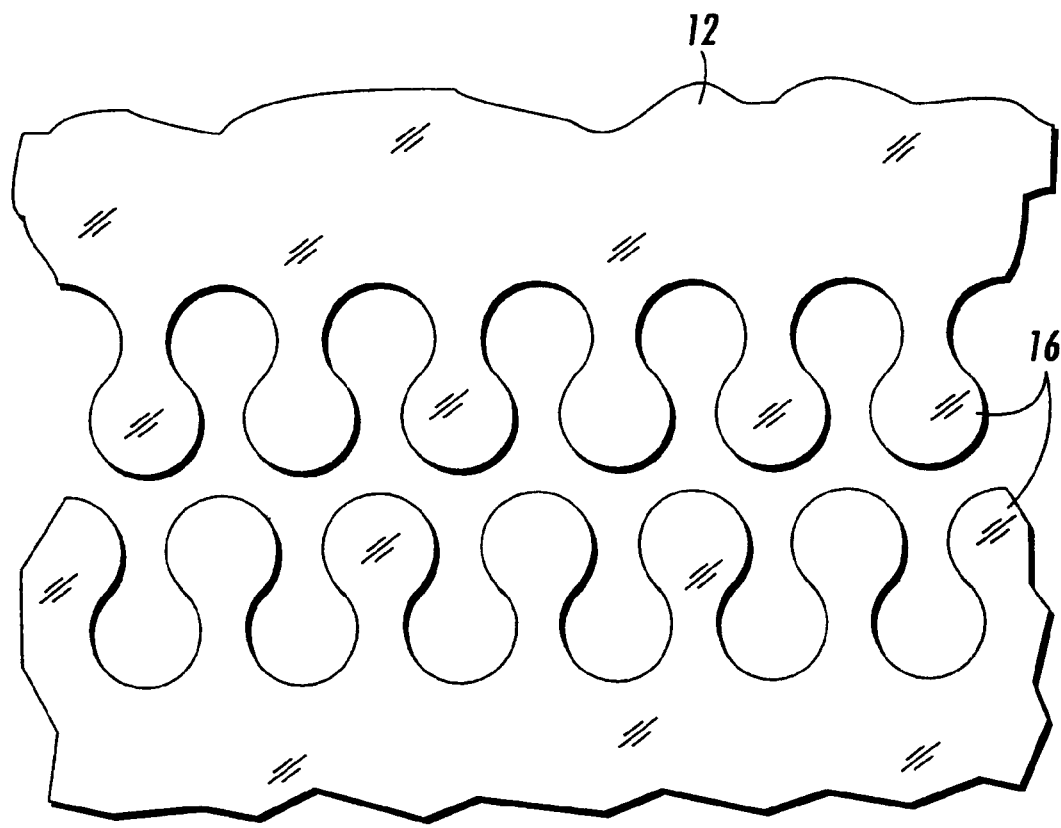
Figure 4:
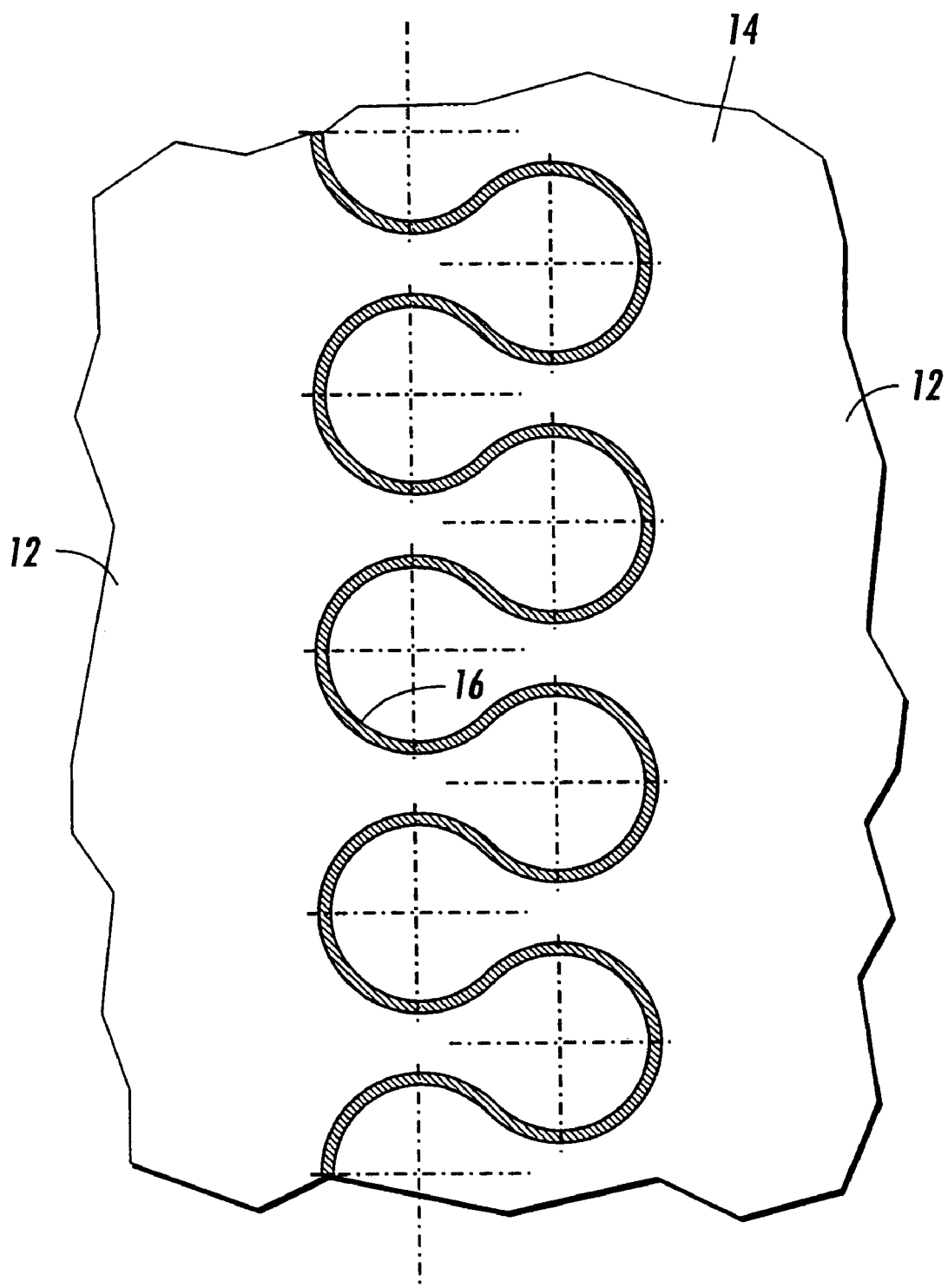

FIG. 3 is an enlarged plan view (partially broken away) of the opposing seam-forming ends of an exemplary puzzle-cut seam for the exemplary seamed intermediate image transfer belt of FIG. 2 before those puzzle-cut belt ends are joined together to form the belt seam holding the two ends of the belt together to form an endless loop belt; and FIG. 4 is an enlarged plan view (partially broken away) of the completed, finished, seam of the transfer belt of FIGS. 2 and 3.

Figure 1:
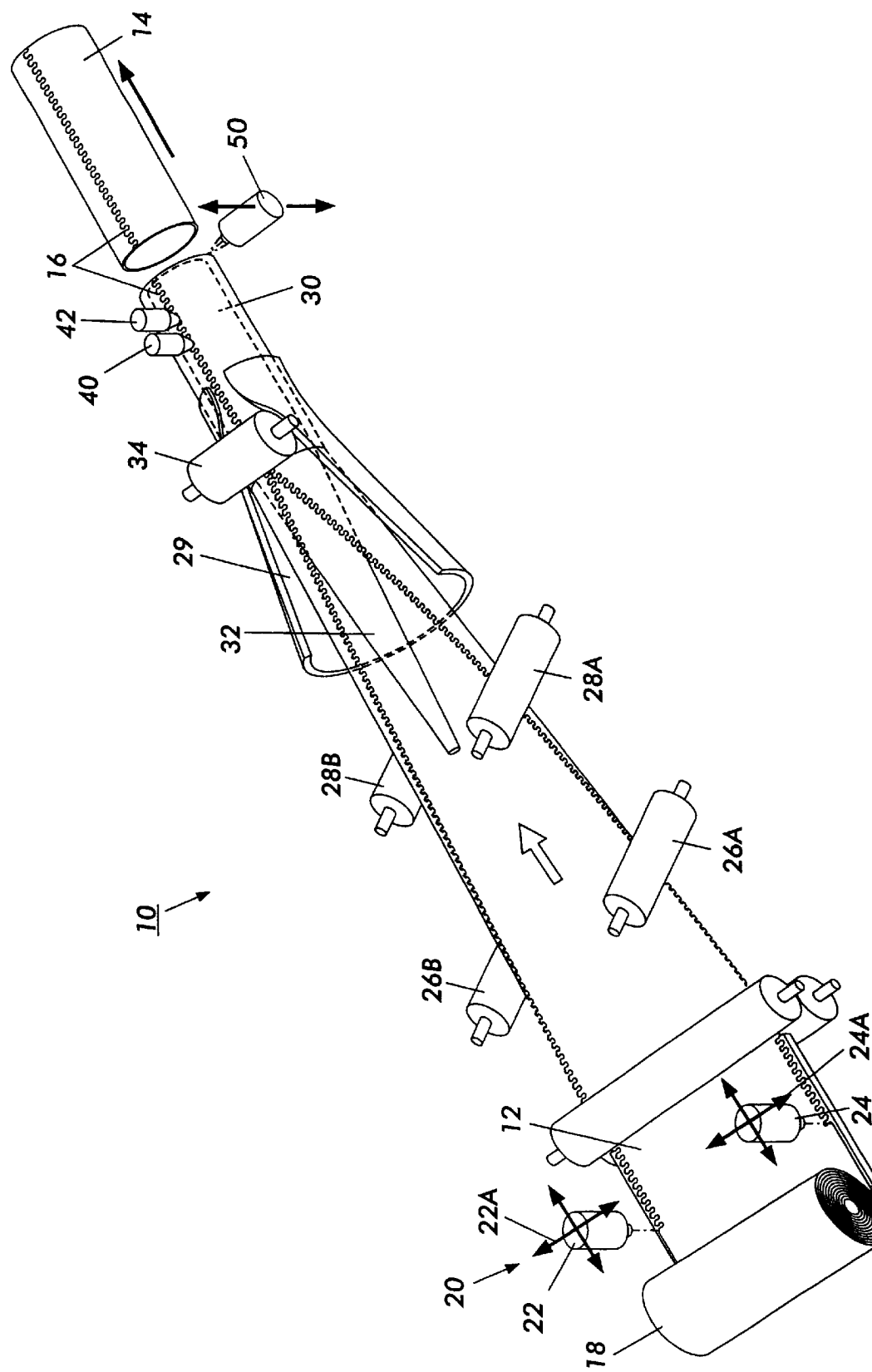
FIG. 1 is a perspective schematic view of one exemplary embodiment of a continuous manufacturing system for producing quantities of seamed intermediate image transfer belts for xerographic printers.

Referring first to FIG. 1, there is shown one example of a seamed belt manufacturing system 10 providing an apparatus and method for production of multiple such belts in a more continuous and automatic manner and at lower cost. The illustrated system 10 continuously moves a supply web 12 of the selected belt material through a series of automatic processes in a relatively linear moving assembly line fashion, to form finished seamed belts 14 at the end thereof, such as the finished belt 14 shown in FIG. 2. Each finished belt 14 has a puzzle-cut seam 16 as shown in FIG. 2 and as shown enlarged in FIG. 4. A large stationary roll 18 of suitable belt material 12, of the selected suitable width 12A for the desired finished belt circumference, may have its free end fed through the system on startup. Thereafter a large number of seamed belts may be continuously automatically produced from a continuously fed web 12 that is at least as wide as the finished belt loop must be long, so that the puzzle-cutting may be done continuously along the edges of the supply web 12 as that supply web advances, and so that the finished belts 14 may be joined together and fastened width-wise or transversely relative to the moving web 12.

In this system 10 of FIG. 1, the uncut moving belt material web 12, fed from the unrolling of its supply roll 18, enters a puzzle-cutting station 20. For illustrative clarity two laser cutters 22 and 24 are shown schematically in this puzzle-cutting station 20, with respective small two axis movement systems 22A and 24A shown schematically by their movement arrows, since numerous suitable or even commercial servo driven or mechanical two-axis movement systems are well known and may be used. For example, those commercially used for pre-programmed movements of machine tools in manufacturing. Some examples of two axis (x-y) drive systems are shown in U.S. Pat. No. 3,670,426 FIGS. 5–8 or U.S. Pat. No. 4,954,913 FIG. 1. These respective movable lasers 22 and 24 (or alternative mirror beam steering systems for their laser beams), need only move their cutting laser beams transversely in and out by only the dimensions of the puzzle-cut tabs or fingers. Where the desired puzzle-cutting pattern forms the tabs with "undercuts" and enlarged heads, as shown particularly in FIG. 3, it will be appreciated that small coordinated movements of the cutting beam in the direction of movement of the web may also be required for that type of laser cutter.

However, another method of laser cutting the respective mating belt seam tabs on each side of the web does not require any movement of the lasers. A fixed laser with beam-spreading optics may be used to cover an appropriate (2–5 sq. cm.) area of known quartz glass mirrored surface mask bearing the desired cutting pattern. The laser energy passes through the mask only in the pattern-etched areas of the mask. That mask pattern may consist of the shape of one or more of the desired tabs. The belt web material is moved under this mask in a repeated step movement in a step distance corresponding to those same one or more tabs so as to cut each web edge into the desired continuous seam edge pattern. Laser cutting several tabs or seam nodes at a time in this manner with a plural tabs mask is faster and reduces the number of incremental stepping movements of the web. To increase the accuracy of the incremental stepping movement of the web, it may be overfed from the web roll into an accumulator or dancer roll loop, and/or fed with a unidirectional vacuum tractor web feeder from under the web. This may be done instead of, or in coordination with, incrementing the FIG. 1 illustrated large feed roller transversely engaging the web just downstream of the puzzle-cutting stations.

After the opposing moving edges of the moving web 12 have been cut into mating puzzle cut patterns in the puzzle-cutting station 20, the moving web 12 may be curved (with stationary guiding traction rollers 26A, 26B and 28A, 28B, or the like, and/or external tube forming guide baffles 29) to wrap the web 12 around a stationary tubular (here cylindrical) mandrel 30 which has its axis extending in the same process or web movement direction. The mandrel 30 may have a tapered leading end 32 as shown, increasing in diameter to its full operating diameter which, in this particular illustrated example, provides a circumference of almost the same circumference as the circumference of the intended finished seamed belts. Similarly, The mandrel 30 may have a tapered trailing end (not shown), which would facilitate belt removal from the mandrel.

The opposing puzzle cut patterns on the opposing sides of the moving web 12 are now overlapped and interdigitated (mated) together while moving on the mandrel 30 surface, which locks them together in a seam 16 like closing a "zipper". An additional stationary pressure roller 34 (or rollers) is preferably used to press both belt ends together against the mandrel 30 outer surface at that point. A suitable liquid seam adhesive and seam filler material (as described in the cited references) may then be applied to the seam 16 by a glue dispensing system 40 and then UV lamp 42 cured. The seam 16 area may also then be ground, polished and/or coated as desired or described in the above-cited or other patents. These latter steps preferably all occur in rapid sequence with the web 12 still moving along the mandrel 30.

The now formed web tube then moves on to just past the end of (or a gap in) the mandrel 30, where a laser cutter 50 (or cut-off saw) intermittently operates at the desired times to sequentially cut off finished seamed belts into their desired widths, thus forming finished seamed belts 14 with the fine seam quality control needed to produce belts with imageable seams. By pre-cutting transversely through a portion or portions of the web at an upstream pre-cutting station, earlier in the process, the amount (circumference) of web cutting required in this cut-off station 50 can be greatly reduced.

Laser cutting per se is a well developed art, and the disclosed system is not limited to any particular type. The particular laser system type, energy density, and/or pulse repetition rates selected by those skilled in that art can vary with the particular belt material and thickness to be cut through with the laser beam and the cutting rate or speed, which will depend on the feeding rate of the web material here. It is believed that an ultraviolet (UV) laser frequency of about 248 nm will be suitable for cutting various belts of polyaniline and carbon black filled polyimide substrates as well as such belts having polyanaline and or zeloc filled polyimide films on those substrates. Excimer and triple frequency multiplied YAG lasers are believed to be capable of effectively producing such UV frequencies.

If desired, upstream of the subject puzzle-cutting operation the belt may be suitably overcoated, and/or suitable adhesives applied to edge areas, and or electrostatically corona treated, and dried, as desired. Downstream of this processing system 10 the seamed belts 13 may be subjected to further processing such as overcoatings, edge treatments and/or reinforcements, and automatic packaging. Those additional optional belt processing steps need be shown or described herein. Also, it will be appreciated that the above described operations of the system 10 could be performed vertically instead of horizontally, and that various known registration and/or laser alignment systems may be incorporated to locate and control the web position.

As for further alternatives or variations, it will be appreciated that the mandrel 30 need not necessarily fully conform to or fully support either the belt web or the inside of the finished belt loop tube. Furthermore, the mandrel 30 may desirably have, or transition to, a flat surface area in the area thereof in which the adhesive material is being applied and/or set, i.e., the area of the mandrel 30 under the belt seam 16 as that seam is closed and moves along the mandrel 30, so that this seam 16, or other belt seam, may be adhered together while flat. That same general area of the mandrel 30 which is underlying the seam glue setting area may also be heated, and/or supported for pressure application against the outside of the belt for a pressure setting adhesive.

In that regard, the adhesive used may even be a dry powder adhesive or a dry film adhesive, and the latter may be applied by a tape applicator, instead of a liquid adhesive applicator. Specifically, a selected seam-sealing material compatible with the belt material properties may be pre-applied to a conventional release liner tape. That tape may be inserted in a known tape dispenser automatically paying out that tape over the belt seam in the seam movement direction. Pressure and heat may be applied from behind the tape against the seam with, for example, a heated roller to flow that seam-sealing material off the tape into the seam, and the release liner tape may then be automatically stripped off.

While the embodiments disclosed herein are preferred, it will be appreciated from this teaching that various alternatives, modifications, variations or improvements therein may be made by those skilled in the art, which are intended to be encompassed by the following claims.

What is claimed is:

1. An improved system for manufacturing large quantities of seamed belts with imageable seams for printing systems, wherein said manufactured seamed belts have a predetermined defined circumference and a predetermined width, from a belt material which is available in a large continuous web roll with opposing side edges, comprising:

a seam cutting station, a web feeding system for feeding a continuous web of said belt material from said large roll to said seam cutting station in a defined web width between said opposing side edges that is at least as wide as said predetermined defined circumference of said seamed belts, said seam cutting station cutting said opposing side edges of said continuous web of belt material into opposing seam-forming mating edge patterns, a web wrapping system including a mandrel surface for wrapping said opposing side edges of said continuous web of belt material together on said mandrel surface while said continuous web of belt material is moving thereon, a seam mating system for mating said opposing mating edge patterns together to form a belt seam in a moving tube of said continuous web of belt material, an adhesive applicator system for adhesively sealing said moving belt seam, and a web tube cutting system for sequentially intermittently transversely cutting off increments of said moving tube of said continuous web of belt material to said predetermined width of said seamed belt.

2. The improved system for manufacturing large quantities of seamed belts with imageable seams for printing systems of claim 1, wherein said seam cutting station comprises laser cutting systems on said opposing side edges of said continuous web of belt material operating to cut mating puzzle-cut locking seam patterns on said opposing side edges of said continuous web of belt material.

* * * * *